United States Patent

Kargathra et al.

Patent Number: 5,458,536
Date of Patent: Oct. 17, 1995

[54] COIN MECHANISMS

[75] Inventors: Dinesh Kargathra, Hounslow; Lawrence Early, Basingstoke, both of United Kingdom

[73] Assignee: Mars Incorporated, McLean, Va.

[21] Appl. No.: 178,274

[22] PCT Filed: Jul. 2, 1992

[86] PCT No.: PCT/GB92/01198

§ 371 Date: May 19, 1994

§ 102(e) Date: May 19, 1994

[87] PCT Pub. No.: WO93/01568

PCT Pub. Date: Jan. 21, 1993

[30] Foreign Application Priority Data

Jul. 8, 1991 [GB] United Kingdom .................. 9114695

[51] Int. Cl.$^6$ ................................................ G07D 1/00
[52] U.S. Cl. ........................................... 453/17; 221/6
[58] Field of Search .................... 453/17; 221/6, 221/125, 129

[56] References Cited

U.S. PATENT DOCUMENTS

| | | | |
|---|---|---|---|
| Re. 33,314 | 8/1990 | Cowles | 221/129 X |
| 3,401,704 | 9/1968 | Jullien-Davin | 453/17 |
| 4,044,877 | 8/1977 | Burton | 221/125 X |
| 4,225,056 | 9/1980 | Flubacker | 221/2 |
| 4,835,412 | 5/1989 | Hudis et al. | 194/200 X |

FOREIGN PATENT DOCUMENTS

| | | |
|---|---|---|
| 0063426 | 10/1982 | European Pat. Off. |
| 0368780 | 5/1990 | European Pat. Off. |
| 1415162 | 11/1975 | United Kingdom. |
| 2071384 | 9/1981 | United Kingdom. |
| WO88/05194 | 7/1988 | WIPO. |

*Primary Examiner*—F. J. Bartuska
*Attorney, Agent, or Firm*—Davis Hoxie Faithfull & Hapgood

[57] ABSTRACT

A coin mechanism having a plurality of coin storage and dispensing assemblies (2, 4; 2', 4'), each one of the assemblies being provided with a plurality of detectors (6, 8; 10; 12, 14) each for detecting a respective parameter of that assembly, characterized by a plurality of output lines (01, 02) one for each assembly, each of which output lines is coupled to all the detectors of its assembly, a plurality of activation lines (A1, A2, A3), each of which is coupled to a group of said detectors comprising a detector for each assembly, and control circuitry connected to the activation lines, wherein the control circuitry drives the activation lines one at a time to activate the detector groups one at a time, whereby to produce sequentially on the single output line of each assembly signals indicative of all the parameters for that assembly as its detectors are sequentially activated by the driving of the activation lines.

9 Claims, 1 Drawing Sheet

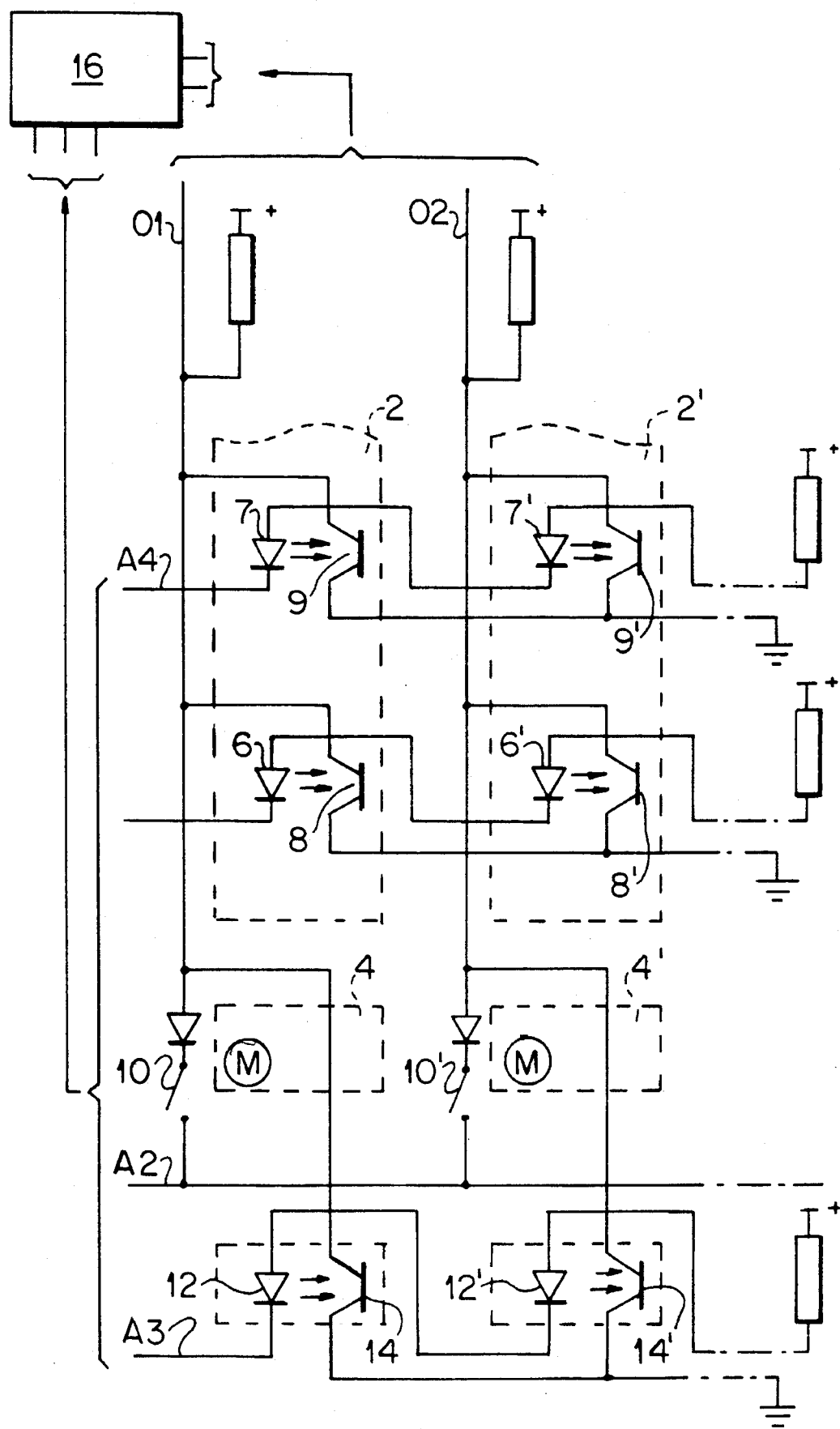

COIN MECHANISMS

FIELD OF THE INVENTION

This invention relates to coin mechanisms.

BACKGROUND OF THE INVENTION

It is well known, for the purpose of giving change or paying out prizes, to provide coin mechanisms with a plurality of coin storage and dispensing assemblies. Typically, the mechanism will have a coin validator for validating coins of different denominations, a plurality of coin storage tubes, each for receiving accepted coins of a respective denomination, and a dispensing device, operated by a solenoid or rotary motor, beneath the lower end of each coin tube for dispensing coins from the tube. The set of dispensing devices may be contained within a single unit extending across the bottoms of all the tubes. In such a typical mechanism, for the purposes of the present specification, a coin storage tube and the dispensing device located below it are referred to as a coin storage and dispensing assembly.

The various operations of such coin mechanisms, such as the validation of coins, the setting of gates to accept or reject coins, the setting of further gates to route accepted coins to the appropriate tubes, the setting of gates to route accepted coins to a cashbox if the coin tube for that particular denomination is full, inhibiting the dispensing of coins from a particular tube when that tube is nearly empty, counting the coins dispensed from each tube so as to keep a running total of the number of coins left in the tubes, and various other operations, are controlled by control circuitry frequently including one or more microprocessors.

For the purpose of exercising that control in relation to operations involving the coin storage and dispensing assemblies, the control circuitry needs to have constantly updated information regarding various parameters of the individual assemblies. Such parameters may include whether the level of stored coins is below a predetermined lower level, whether it is above a predetermined upper level, whether a coin dispensing device is in its home, or rest, position, and whether a coin is being delivered from the dispensing device.

A coin mechanism may have, for example, five coin storage and dispensing assemblies and, for each assembly, it might be required to monitor the four parameters just mentioned above. A separate detector will be provided for monitoring each parameter in each assembly. Thus, twenty detectors in all would be required, and twenty wires would be required to transmit the detector outputs to the control circuitry.

SUMMARY OF THE INVENTION

An object of the present invention is to very substantially reduce the number of wires required for that the above purpose.

According to the invention, there is provided a coin mechanism having a plurality of coin storage and dispensing assemblies, each said assembly being provided with a plurality of detectors each for detecting a respective parameter of that assembly, characterised by a plurality of output lines one for each assembly, each of which output lines is coupled to all said detectors of its assembly, a plurality of activation lines, each of which is coupled to a group of said detectors comprising a detector for each said assembly, and means for driving the activation lines one at a time to activate the detector groups one at a time, whereby to produce sequentially on the single output line of each assembly signals indicative of all the parameters for that assembly as its detectors are sequentially activated by the driving of the activation lines.

Preferably, but not essentially, the detectors in a group all detect the same parameter, but for respective different assemblies.

The detectors for each assembly need not be of similar kind, for example in the embodiment to be described some are electro-optical and others are electro-mechanical.

BRIEF DESCRIPTION OF THE DRAWINGS

The accompanying FIGURE is a schematic representation of a coin mechanism according to the prevent invention.

DETAILED DESCRIPTION

In order that the invention may be more clearly understood, an embodiment thereof will now be described, by way of example, with reference to the accompany diagrammatic drawing.

The drawing shows, schematically and in broken lines since the details are unimportant, the lower ends of two coin tubes 2 and 2' which, in conjunction with respective coin dispensing devices 4 and 4', driven by respective motors M, constitute two coin storage and dispensing assemblies. In practice there may, of course, be several more such assemblies in a coin mechanism, but it is not necessary to describe more since the invention can be understood with reference to only two.

Near the lower end of tube 2 there is a light emitting diode (LED) 6, the light from which reaches a phototransistor 8 when the coins in tube 2 are at level below LED 6 and phototransistor 8. In a similar manner, a LED 7 and a phototransistor 9 are disposed at a position within the coin tube 2 above the LED 6 to detect when coins are at the higher level of the LED 7. A switch 10 is associated with the motor of dispenser 4 and is controlled by the motor so that it is open when the motor is at its rest or home position, but is closed when the motor is in any other position. Below the first dispenser is another LED 12 and an associated phototransistor 14 arranged so that the beam from LED 12 to phototransistor 14 will be broken by a coin successfully dispensed by dispenser 4.

The second storage and dispensing assembly 2', 4', is similarly equipped with electro-optical low level, high level and dispense detectors, and an electromechanical switch as a motor home detector. The components of these are given similar references to corresponding components for the first tube assembly, but with an added prime.

LEDs 6 and 6' are both connected in an activation line A1 so that, if line A1 is driven low, current flows through the two LEDs in series. The lower terminals of both switches 10 and 10' are connected to a second activation line A2, and LEDs 12 and 12' of the dispense detectors are connected in series in a third activation line A3. In a similar manner, LEDs 7 and 7' are connected in series in an activation line A4.

In this way, the low and high level detectors can be activated as respective groups by driving lines A1 or A4, the switches 10 and 10' can be activated as a group by driving line A2 low and the dispense detectors 12,14 and 12', 14' can be activated as a group by driving line A3 low.

The two assemblies are each provided with a single output line, these being indicated at 01 and 02 respectively. Output line 01 is coupled to all the detectors of the first tube assembly, that is to say to one terminal of photo-transistor 8, to one terminal of phototransistor 9, to the upper terminal of switch 10 and to the upper terminal of phototransistor 14.

Output line 02 is connected similarly to the corresponding detectors associated with the second coin storage and dispensing assembly.

Control circuitry 16 of the coin mechanism is arranged in generally known manner to drive the activation lines A1, A2, A3 and A4 sequentially.

When line A1 is driven, output line 01 or 02 will go low if coins are not obstructing the beams of respective LED 6 or 6', but otherwise they will stay high. In an identical manner, when line A4 is driven, output line 01 or 02 will go low if coins are not obstructing the beams of respective LED 7 or 7', but otherwise will stay high. When line A2 is driven, output line 01 or 02 will go low if respective switches 10 or 10' are closed, but otherwise they will stay high. When line A3 is driven, output line 01 will go low if a coin is not breaking the light beam between LED 12 and phototransistor 14, but if a coin is breaking that beam, i.e. is coming free of the dispenser 4, it will stay high. The signal on output line 02 will similarly stay high if a coin is being dispensed by dispenser 4'.

It can thus be appreciated that the single output line 01 from the first coin storage and dispensing assembly sequentially provides signals to the control circuitry 16 which are indicative of whether the coin level in the tube 2 is high or low, whether the motor of the dispenser 4 is home, and whether a coin is being dispensed. Similarly, output line 02 sequentially provides signals indicative of the same four parameters for the second assembly, as would further output lines associated with similar parameter detectors of further coin storage and dispensing assemblies. Such further detectors and assemblies have not been illustrated, but the detectors would be coupled in a similar manner to the activation lines A1, A2, A3 and A4 in the regions shown as chain-dotted lines.

Thus if, for example, five coin storage and dispensing assemblies were present and it was necessary to monitor the above four parameters for each assembly, this could be done using only nine wires leading from the control circuit 2, namely four activation lines and five output lines, rather than twenty wires as would be required in conventional arrangements.

We claim:

1. A coin mechanism comprising: a plurality of coin storage and dispensing assemblies, each said assembly being provided with a plurality of detectors each for detecting a respective parameter of that assembly; a plurality of output lines one for each assembly, each of which output lines is coupled to all said detectors of its assembly; a plurality of activation lines, each of which is coupled to a group of said detectors comprising a detector for each said assembly; and means for driving the activation lines one at a time to activate the detector groups one at a time, whereby to produce sequentially on the signal output line of each assembly signals indicative of all the parameters for that assembly as its detectors are sequentially activated by the driving of the activation lines.

2. A coin mechanisms as claimed in claim 1 wherein the detectors in a group all detect the same parameter, but for respective different assemblies.

3. A coin mechanism as claimed in claim 1 wherein the detectors of each said assembly are adapted to detect two or more of: whether the level of stored coins is below a predetermined lower level, whether it is above a predetermined upper level, whether a coin dispensing device is in its home position, and whether a coin is being delivered from the dispensing device.

4. A coin mechanism as claimed in claim 1 wherein the detectors of each said assembly include both electro-optical and electro-mechanical detectors.

5. A coin mechanism comprising: a plurality of coin storage and dispensing assemblies, each said assembly being provided with a plurality of detectors each for detecting a respective parameter of that assembly; a plurality of output lines one for each assembly, each of which output lines is coupled to all said detectors of its assembly; a plurality of activation lines, each of which is coupled to a group of said detectors comprising a detector for each said assembly; and control circuitry coupled to the activation lines, wherein the control circuitry drives the activation lines one at a time to activate the detector groups one at a time, whereby to produce sequentially on the signal output line of each assembly signals indicative of all the parameters for that assembly as its detectors are sequentially activated by the driving of the activation lines.

6. A coin mechanism as claimed in claim 5 wherein the detectors in a group all detect the same parameter, but for respective different assemblies.

7. A coin mechanism as claimed in claim 5 wherein the detectors of each said assembly are adapted to detect two or more of: whether the level of stored coins is below a predetermined lower level, whether it is above a predetermined upper level, whether a coin dispensing device is in its home position, and whether a coin is being delivered from the dispensing device.

8. A coin mechanism as claimed in claim 5 wherein the detectors of each said assembly include both electro-optical and electromechanical detectors.

9. A method for detecting parameters of a plurality of coin storage and dispensing assemblies comprising:

disposing a plurality of detectors within each assembly, each detector detecting a respective parameter of that assembly;

coupling a plurality of output lines to the plurality of assemblies, each output line being coupled to a corresponding assembly, wherein each output lines is coupled to all said detectors of that assembly;

coupling a plurality of activation lines to the plurality of assemblies, each activation line being coupled to a group of the detectors, the group comprising a detector in each said assembly; and driving the activation lines one at a time to activate the detector groups one at a time, whereby to produce sequentially on the signal output line of each assembly signals indicative of all the parameters for that assembly as its detectors are sequentially activated by the driving of the activation lines.

\* \* \* \* \*